US006864643B2

United States Patent
Min et al.

(10) Patent No.: US 6,864,643 B2
(45) Date of Patent: Mar. 8, 2005

(54) BACKLIGHT INVERTER FOR LIQUID CRYSTAL DISPLAY PANEL OF ASYNCHRONOUS PULSE WIDTH MODULATION DRIVING TYPE

(75) Inventors: Byoung Own Min, Kyungki-do (KR); Hyoung Jun Jeon, Kyungki-do (KR); Hyun Jin Kim, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/668,356

(22) Filed: Sep. 24, 2003

(65) Prior Publication Data
US 2004/0263095 A1 Dec. 30, 2004

(30) Foreign Application Priority Data
Jun. 24, 2003 (KR) ................................ 10-2003-0041284

(51) Int. Cl.[7] .............................................. H05B 41/24
(52) U.S. Cl. ....................... 315/246; 315/299; 315/308; 315/360
(58) Field of Search ......................... 315/246, 276–277, 315/282–283, 287, 291, 299, 307–308, 360, DIG. 4; 345/102

(56) References Cited

U.S. PATENT DOCUMENTS

| 6,259,615 | B1 | | 7/2001 | Lin ............................... 363/98 |
| 6,501,234 | B2 | * | 12/2002 | Lin et al. ..................... 315/307 |
| 6,707,264 | B2 | * | 3/2004 | Lin et al. ..................... 315/307 |
| 2002/0057238 | A1 | * | 5/2002 | Nitta et al. ................... 345/87 |

* cited by examiner

Primary Examiner—Thuy Vinh Tran
(74) Attorney, Agent, or Firm—Lowe Hauptman & Berner, LLP

(57) ABSTRACT

A backlight inverter for an LCD panel of an asynchronous pulse width modulation (PWM) driving type which is capable of driving a plurality of cold cathode fluorescent lamps (CCFLs) in pairs and controlling a plurality of PWM drive signals for respective operations of the lamps to make the phases thereof different. The backlight inverter comprises a main driving integrated circuit (IC), at least one sub-driving IC, and a plurality of lamp operating circuits for operating the pairs of lamps in response to the first and second PWM drive signals and the third and fourth PWM drive signals, respectively. The lamps have different PWM on/off periods so that overshoot of a power supply circuit can be reduced so as to keep the entire system power stable.

11 Claims, 11 Drawing Sheets

BACKLIGHT INVERTER FOR LIQUID CRYSTAL DISPLAY PANEL OF ASYNCHRONOUS PULSE WIDTH MODULATION DRIVING TYPE

BACKGROUND OF THE INVENTION

1. Field of the Invention

The present invention relates to a backlight inverter for a thin film transistor-liquid crystal display (TFT-LCD) panel, and more particularly to a backlight inverter for an LCD panel of an asynchronous pulse width modulation (PWM) driving type, which is capable of delaying a plurality of pairs of PWM drive signals, which are inputted respectively to power switches to drive a plurality of cold cathode fluorescent lamps (CCFLs) in pairs, sequentially by a predetermined time interval in such a manner that the PWM drive signal pairs corresponding respectively to the lamp pairs have different phases and the lamps thus have different PWM on/off periods, so that overshoot of a power supply circuit can be reduced so as to keep the entire system power stable and so that switching noise based on PWM dimming can be reduced so as to reduce screen noise and increase system reliability.

2. Description of the Related Art

Generally, CCFLs are operated at low current, resulting in advantages such as low power consumption, low heat, high brightness and long life. In this regard, the CCFLs have recently been used in various display devices such as a backlight unit of a computer monitor, for example, a TFT-LCD, and a display panel of a printer. A high alternating current (AC) voltage of about 1–2 kV/several tens kHz is required to light such a CCFL, and an inverter is utilized to provide such a high AC voltage by performing a DC/AC conversion operation with respect to a direct current (DC) voltage of about 5 to 30V.

In such an inverter, each CCFL is turned on with an AC voltage of several tens kHz provided through a power switch, a converter and a transformer oscillator. In the case of being applied to a backlight unit of a computer monitor, CCFLs, typically on the order of 4 to 8, are installed, and controlled with PWM drive signals, respectively.

FIG. 1 is a circuit diagram showing the construction of a conventional backlight inverter for an LCD panel.

With reference to FIG. 1, the conventional backlight inverter comprises power switches SWA and SWB for converting a DC voltage Vcc into square-wave voltages, respectively. The square-wave voltages from the power switches SWA and SWB are boosted and oscillated by converters 120A and 120B, each of which consists of an inductor and a diode, and transformer oscillators 130A and 130B, respectively, such that they are converted into AC voltages of about 1–2 kV/40 kHz for lighting CCFLs 140A and 140B.

At this time, voltages resulting from currents flowing through the lamps 140A and 140B are detected by lamp voltage detectors 150A and 150B, respectively, and then fed to a driving integrated circuit (IC) 110. The driving IC 110 provides PWM drive signals to the power switches SWA and SWB on the basis of the detected lamp voltages, a dimming voltage Vdim and a PWM oscillation signal PWM OSC. Notably, the conventional backlight inverter for the LCD panel employs a PWM dimming system to adjust the brightness of the CCFLs on the basis of the dimming voltage Vdim and PWM oscillation signal PWM OSC.

In the conventional backlight inverter for the LCD panel, PWM drive signals inputted respectively to power switches for the dimming of multiple CCFLs have the same on/off times as shown in FIG. 3.

That is, in the conventional backlight inverter for the LCD panel, the power switches SWA and SWB have their on/off periods synchronized to supply powers to the CCFLs, respectively, in response to a PWM pulse generated according to voltage levels of the PWM oscillation signal and dimming voltage Vdim, so as to adjust the brightness of the CCFLs.

FIG. 2 is a block diagram showing the construction of a conventional PWM driving circuit for driving four lamps.

In the case of driving four lamps using the conventional backlight inverter for the LCD panel as shown in FIG. 1, first and second driving ICs 110A and 110B, each of which is the same as the driving IC 110 shown in FIG. 1, are connected in parallel to drive the four lamps, as shown in FIG. 2.

FIG. 3 is a timing diagram of PWM drive signals for driving the four lamps in FIG. 2.

The PWM drive signals PWM1–PWM4 for respective lamp operations, determined depending on the dimming voltage Vdim and PWM oscillation signal PWM OSC, are synchronized to have the same on times and the same off times. As a results all of the power switches SWA-SWD, operated in response to the PWM drive signals PWM1–PWM4, also have their PWM on/off periods synchronized.

With reference to FIGS. 2 and 3, in the case where the backlight inverter for the LCD panel as shown in FIG. 1 is applied to, for example, four lamps, a PWM pulse is outputted from an NCO (Next Chain Out) terminal of the first driving IC 110A shown in FIG. 2 and then inputted to an NCI (Next Chain Input) terminal of the second driving IC 110B. At this time, the power switches Q1 and Q2 are turned on/off in response to the PWM pulse in the same phases thereof, so current waveforms of the lamps have the same phases as shown in FIG. 3.

However, the aforementioned conventional backlight inverter for the LCD panel has a disadvantage in that a plurality of used lamps are synchronized to have the same PWM on/off periods, resulting in the occurrence of overshoot in a power supply circuit in proportion to the number of the used lamps and the concurrence of noises in power switches, causing an increase in switching noise. Further, an oscillation mode, such as lamp flickering, may take place, resulting in screen blinking.

SUMMARY OF THE INVENTION

Therefore, the present invention has been made in view of the above problems, and it is an object of the present invention to provide a backlight inverter for an LCD panel of an asynchronous PWM driving type, which is capable of delaying a plurality of pairs of PWM drive signals, which are inputted respectively to power switches to drive a plurality of CCFLs in pairs, sequentially by a predetermined time interval in such a manner that the PWM drive signal pairs corresponding respectively to the lamp pairs have different phases and the lamps thus have different PWM on/off periods, so that overshoot of a power supply circuit can be reduced so as to keep the entire system power stable and so that switching noise based on PWM dimming can be reduced so as to reduce screen noise and increase system reliability.

In accordance with the present invention, the above and other objects can be accomplished by the provision of a backlight inverter for a liquid crystal display (LCD) panel for driving a plurality of lamps in pairs, comprising: a main driving integrated circuit (IC) for generating first and second pulse width modulation (PWM) pulses in response to a dimming voltage based on a brightness control and an internally generated PWM oscillation signal, delaying the generated first and second PWM pulses by a predetermined period of time and outputting first and second PWM drive signals on the basis of the delayed first and second PWM pulses, respectively; at least one sub-driving IC for secondarily delaying the delayed first and second PWM pulses from the main driving IC by the predetermined period of time and outputting third and fourth PWM drive signals on the basis of the secondarily delayed first and second PWM pulses, respectively; and a plurality of lamp operating circuits for operating the pairs of lamps in response to the first and second PWM drive signals from the main driving IC and the third and fourth PWM drive signals from the sub-driving IC, respectively.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
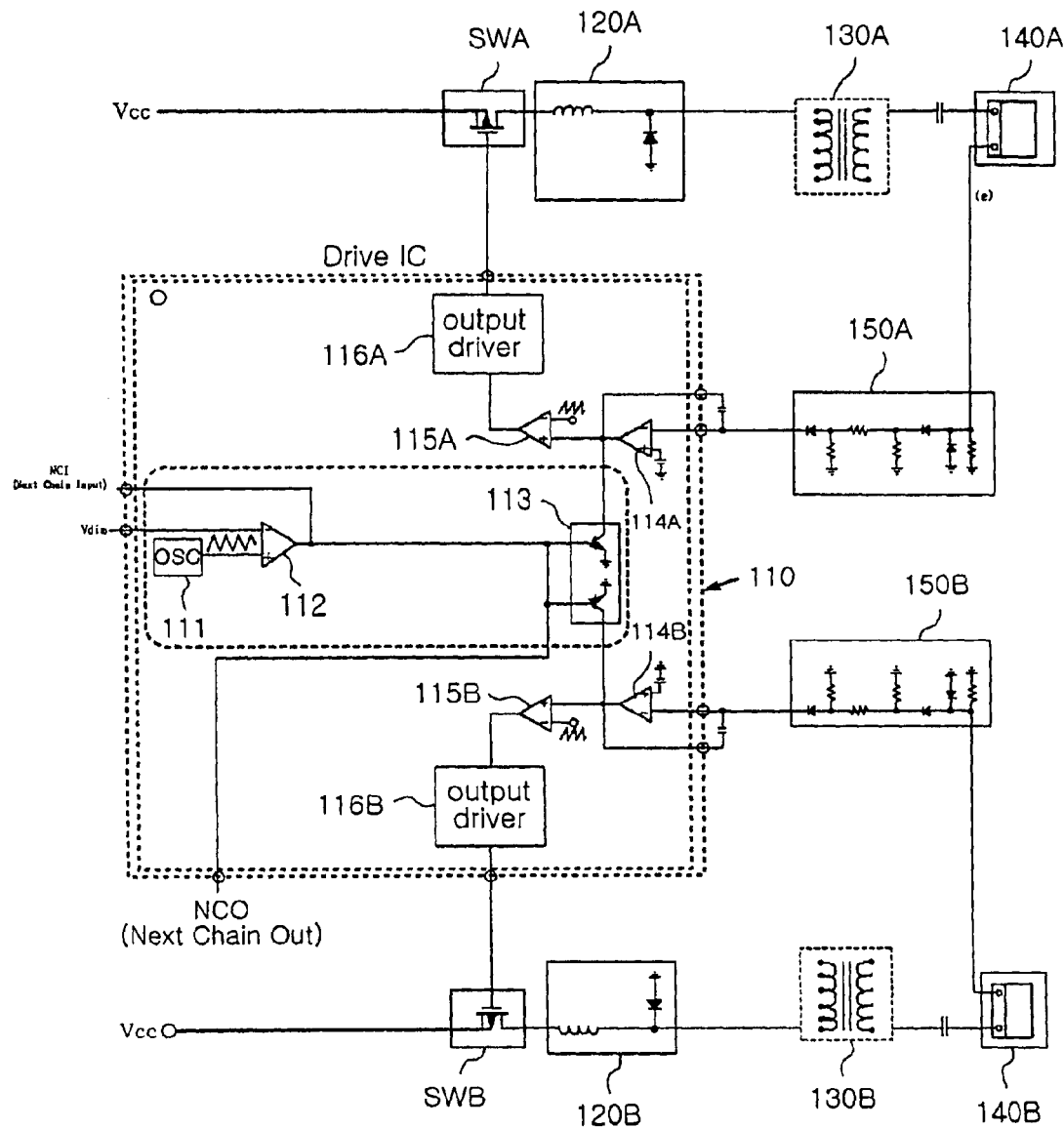
FIG. 1 is a circuit diagram showing the construction of a conventional backlight inverter for an LCD panel.
Figure 2:
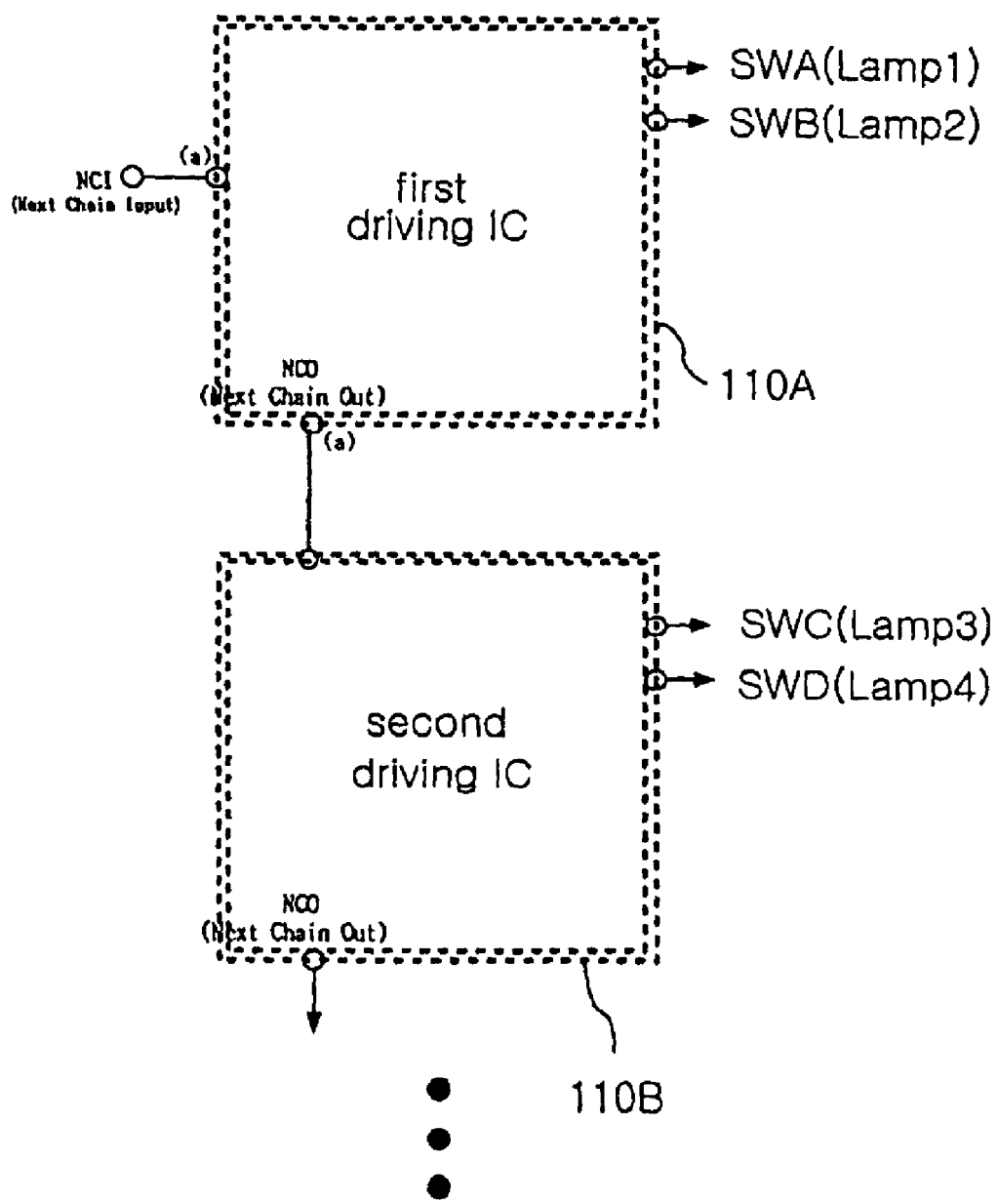
FIG. 2 is a block diagram showing the construction of a conventional PWM driving circuit for driving four lamps.
Figure 3:
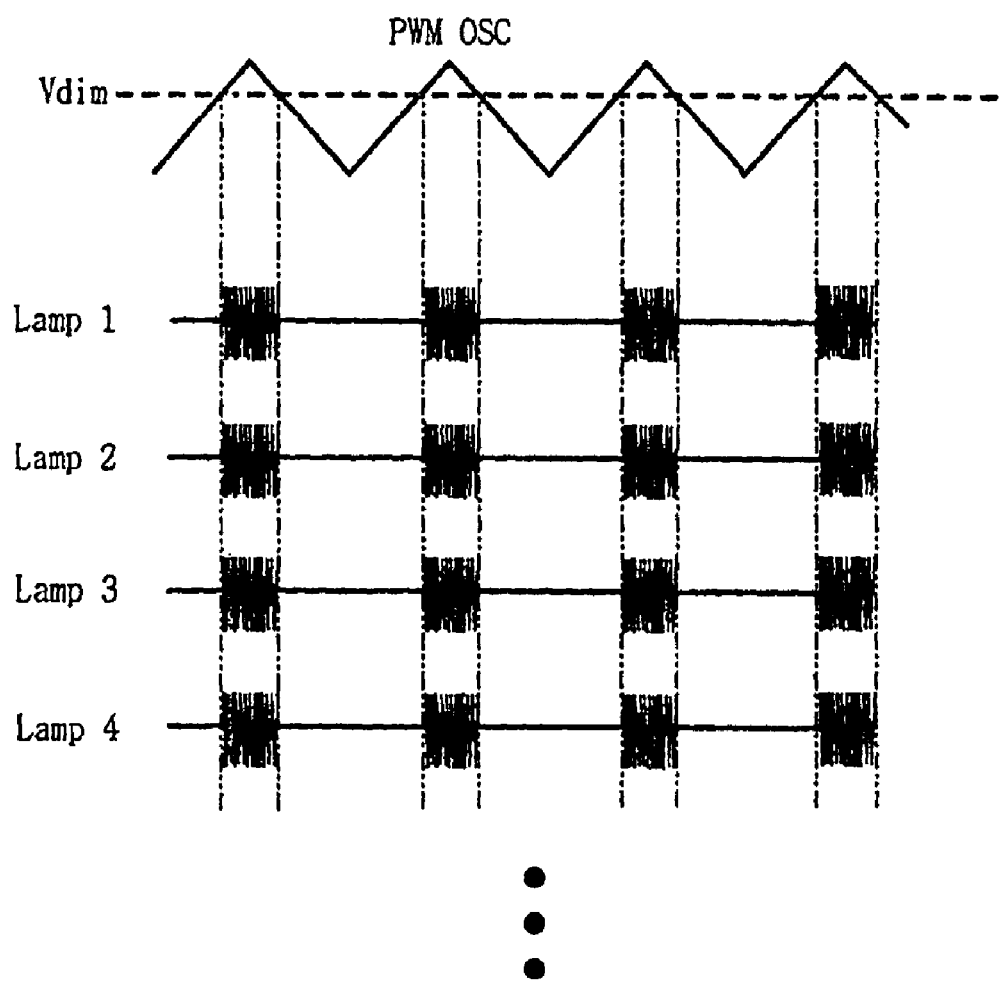
FIG. 3 is a timing diagram of PWN drive signals for driving the four lamps in FIG. 2.

Now, preferred embodiments of the present invention will be described in detail with reference to the annexed drawings. In the drawings, the same or similar elements are denoted by the same reference numerals even though they are depicted in different drawings.

Figure 4:
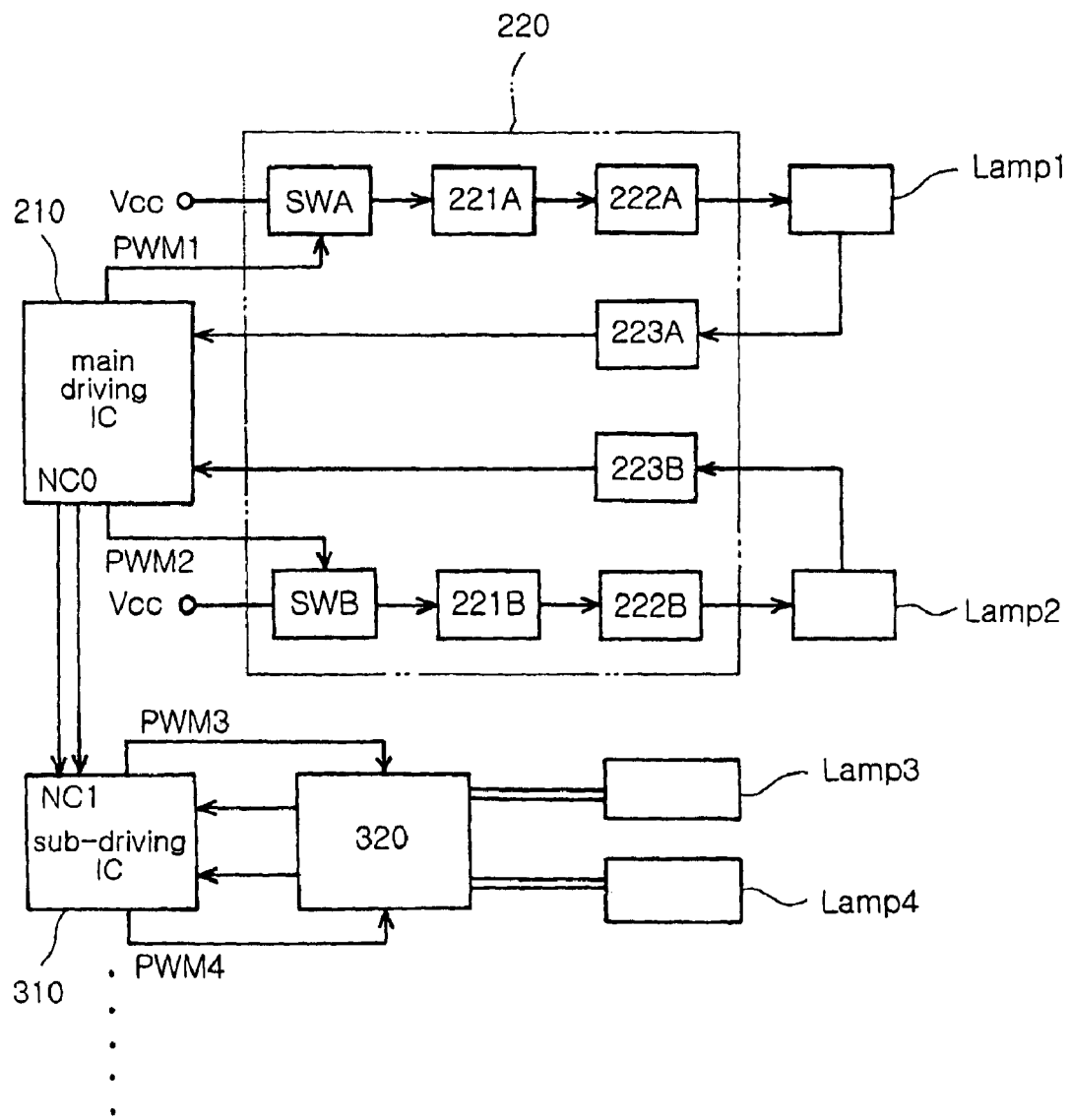
FIG. 4 is a block diagram showing the construction of a backlight inverter for an LCD panel in accordance with the present invention.
Figure 5:
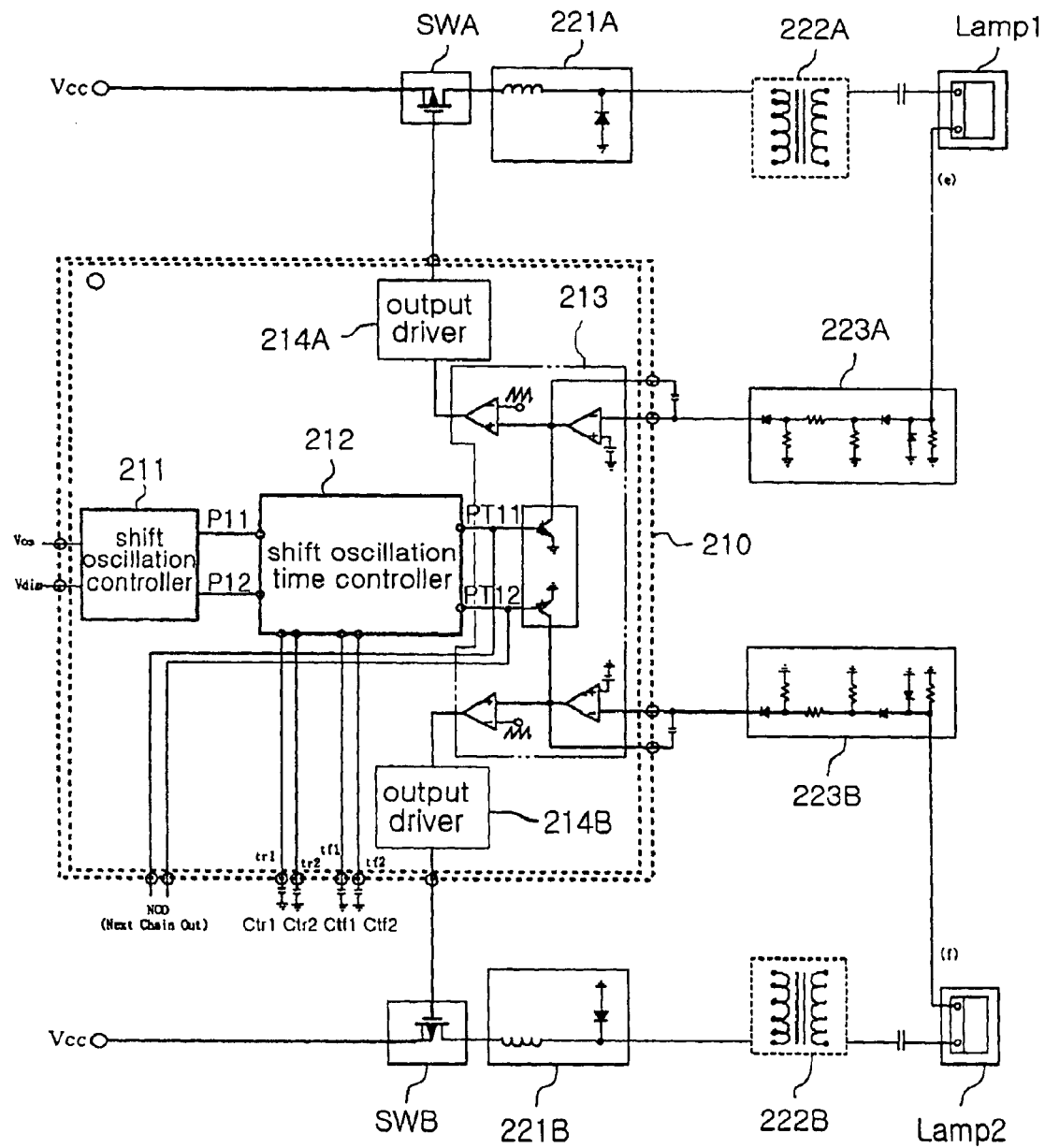
FIG. 5 is a circuit diagram of a main driving IC and an associated lamp operating circuit in FIG. 4.
Figure 6:
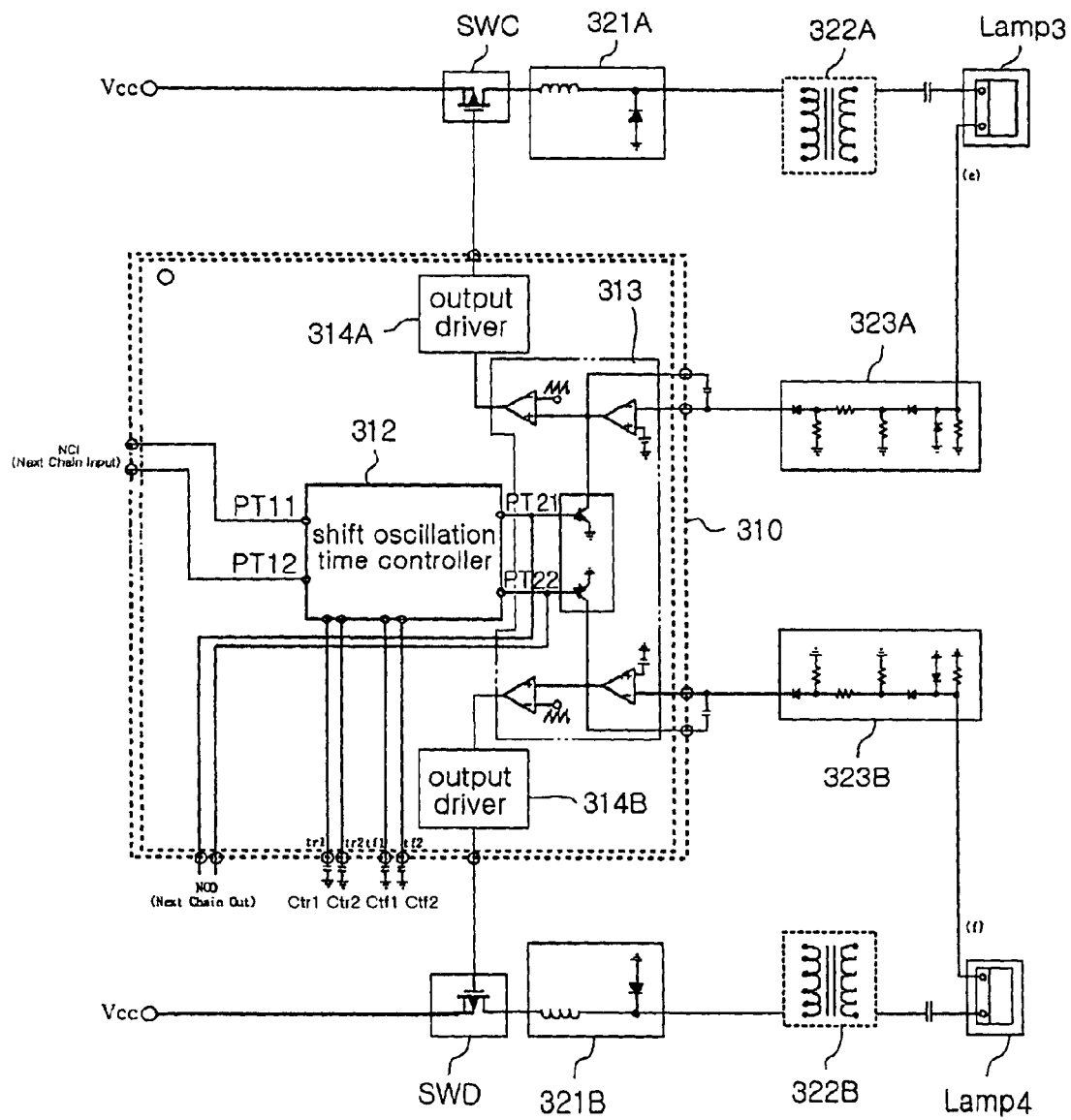
FIG. 6 is a circuit diagram of a sub-driving IC and an associated lamp operating circuit in FIG. 4.

FIG. 4 is a block diagram showing the construction of a backlight inverter for an LCD panel in accordance with the present invention, FIG. 5 is a circuit diagram of a main driving IC and an associated lamp operating circuit in FIG. 4, and FIG. 6 is a circuit diagram of a sub-driving IC and an associated lamp operating circuit in FIG. 4.

With reference to FIGS. 4 to 6, the backlight inverter for the LCD panel according to the present invention is adapted to drive a plurality of lamps Lamp1–Lamp4 in pairs. To this end, the backlight inverter comprises a main driving IC 210 for generating PWM pulses P11 and P12 in response to a dimming voltage Vdim based on a brightness control and an internally generated PWM oscillation signal PWM OSC, delaying the generated PWM pulses P11 and P12 by a predetermined period of time and outputting PWM drive signals PWM1 and PWM2 on the basis of the delayed PWM pulses PT11 and PT12, respectively, a sub-driving IC 310 for delaying the delayed PWM pulses PT11 and PT12 from the main driving IC 210 by the predetermined period of time and outputting PWM drive signals PWM3 and PWM4 on the basis of the delayed PWM pulses PT21 and PT22, respectively, and a plurality of lamp operating circuits 220 and 320 for operating the pairs of lamps Lamp1–Lamp4 in response to the PWM drive signals PWM1 and PWM2 from the main driving IC 210 and the PWM drive signals PWM3 and PWM4 from the sub-driving IC 310, respectively.

With reference to FIGS. 4 and 5, the main driving IC 210 includes a shift oscillation controller 211 for generating the PWM pulses P11 and P12 in response to the dimming voltage Vdim and PWM oscillation signal PWM OSC, a shift oscillation time controller 212 for delaying the PWM pulses P11 and P12 from the shift oscillation controller 211 by the predetermined period of time and outputting the delayed PWM pulses PT11 and PT12 internally, and externally to the sub-driving IC 310, a comparison circuit 213 for comparing the PWM pulses PT11 and PT12 from the shift oscillation time controller 212 with predetermined reference signals to adjust duty ratios of the reference signals according to the PWM pulses PT11 and PT12, respectively, and output drivers 214A and 214B for generating the PWM drive signals PWM1 and PWM2 in response to output PWM pulses from the comparison circuit 213, respectively, and outputting the generated PWM drive signals PWM1 and PWM2 to the lamp operating circuit 220.

The lamp operating circuit 220 includes a pair of power switches SWA and SWB for converting a DC voltage Vcc into square-wave voltages in response to the PWM drive signals PWM1 and PWM2 from the main driving IC 210, respectively, a pair of converters 221A and 221B for rectifying the square-wave voltages from the power switches SWA and SWB, respectively, a pair of transformer oscillators 222A and 222B for converting output voltages from the converters 221A and 221B into AC voltages and outputting the converted AC voltages to the corresponding pair of lamps Lamp1 and Lamp2, respectively, and a pair of lamp voltage detectors 223A and 223B for detecting voltages resulting from currents flowing through the corresponding pair of lamps Lamp1 and Lamp2, respectively.

With reference to FIGS. 4 and 6, the sub-driving IC 310 includes a shift oscillation time controller 312 for delaying the PWM pulses PT11 and PT12 from the main driving IC 210 by the predetermined period of time and outputting the delayed PWM pulses PT21 and PT22 internally, and externally to the subsequent sub-driving IC, a comparison circuit 313 for comparing the PWM pulses PT21 and PT22 from the shift oscillation time controller 312 with predetermined reference signals to adjust duty ratios of the reference signals according to the PWM pulses PT21 and PT22, respectively, and output drivers 314A and 314B for generating the PWM drive signals PWM3 and PWM4 in response to output PWM pulses from the comparison circuit 313, respectively, and outputting the generated PWM drive signals PWM3 and PWM4 to the lamp operating circuit 320.

Figure 8:
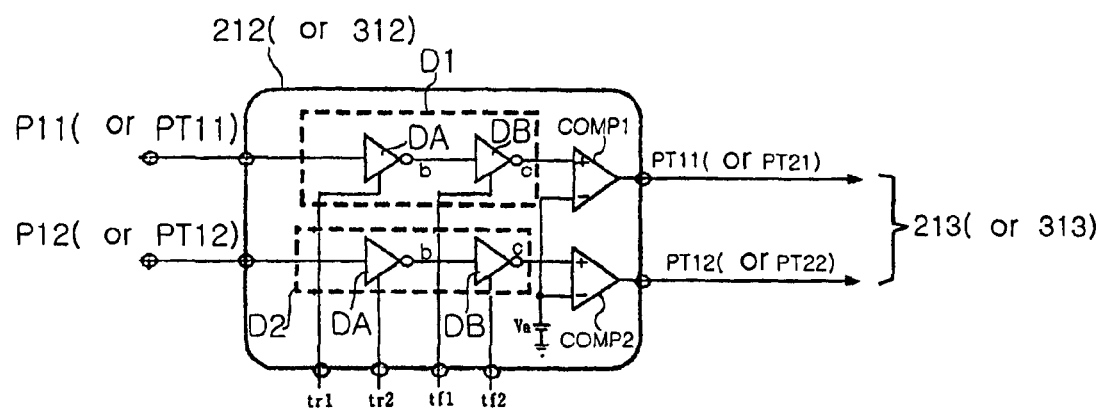
FIG. 8 is a circuit diagram of a shift oscillation time controller in accordance with the present invention.

The shift oscillation time controller 212 and the shift oscillation time controller 312 preferably have the same configuration as shown in FIG. 8. Referring to FIG. 8, the shift oscillation time controller 212 and shift oscillation time controller 312 each include a plurality of delay time setting capacitors Ctr1, Ctr2, Ctf1 and Ctf2 connected respectively to external terminals tr1, tr2, tf1 and tf2 thereof. The delay time can be determined depending on capacitances of the delay time setting capacitors Ctr1, Ctr2 Ctf1 and Ctf2.

The lamp operating circuit 320 includes a pair of power switches SWC and SWD for converting the DC voltage Vcc into square-wave voltages in response to the PWM drive signals PWM3 and PWM4 from the sub-driving IC 310, respectively, a pair of converters 321A and 321B for rectifying the square-wave voltages from the power switches SWC and SWD, respectively, a pair of transformer oscillators 322A and 322B for converting output voltages from the converters 321A and 321B into AC voltages and outputting the converted AC voltages to the corresponding pair of lamps Lamp3 and Lamp4, respectively, and a pair of lamp voltage detectors 323A and 323B for detecting voltages resulting from currents flowing through the corresponding pair of lamps Lamp3 and Lamp4, respectively.

Figure 7:
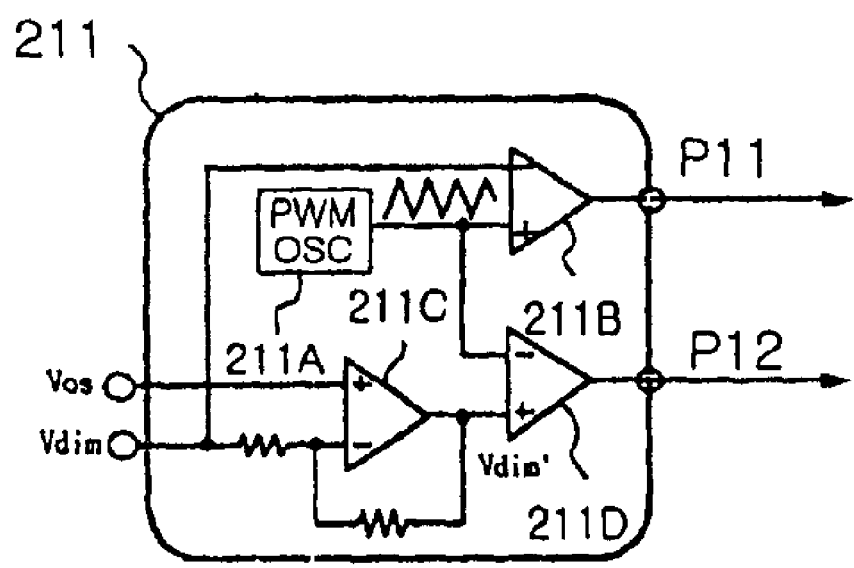
FIG. 7 is a circuit diagram of a shift oscillation controller in accordance with the present invention.

FIG. 7 is a circuit diagram of the shift oscillation controller 211 in accordance with the present invention.

With reference to FIG. 7, the shift oscillation controller 211 includes a PWM oscillator 211A for generating a sawtooth-wave pulse of a predetermined frequency as the PWM oscillation signal PWM OSC, a first comparator 211B for comparing the sawtooth-wave pulse from the PWM oscillator 211A with the dimming voltage Vdim and outputting the first PWM pulse P11 as a result of the comparison, an inverter 211C for inverting the dimming voltage Vdim about a predetermined reference voltage Vos, and a second comparator 211D for comparing the sawtooth-wave pulse from the PWM oscillator 211A with the inverted dimming voltage Vdim' from the inverter 211C and outputting the second PWM pulse P12 as a result of the comparison.

FIG. 8 is a circuit diagram of each of the shift oscillation time controllers 212 and 312 in accordance with the present invention.

With reference to FIG. 8, the shift oscillation time controller 212 in the main driving IC 210 includes a first delay D1 for delaying the first PWM pulse P11 from the shift oscillation controller 211 by the predetermined time period, a second delay D2 for delaying the second PWM pulse P12 from the shift oscillation controller 211 by the predetermined time period, a first output comparator COMP1 for comparing an output signal from the first delay D1 with a reference voltage Vr and outputting the delayed PWM pulse PT11 as a result of the comparison, and a second output comparator COMP2 for comparing an output signal from the second delay D2 with the reference voltage Vr and outputting the delayed PWM pulse PT12 as a result of the comparison.

The shift oscillation time controller 312 in the sub-driving IC 310 includes a first delay D1 for delaying the PWM pulse PT11 from the shift oscillation time controller 212 in the main driving IC 210 by the predetermined time period, a second delay D2 for delaying the PWM pulse PT12 from the shift oscillation time controller 212 in the main driving IC 210 by the predetermined time period, a first output comparator COMP1 for comparing an output signal from the first delay D1 with a reference voltage Vr and outputting the delayed PWM pulse PT21 as a result of the comparison, and a second output comparator COMP2 for comparing an output signal from the second delay D2 with the reference voltage Vr and outputting the delayed PWM pulse PT22 as a result of the comparison.

In one embodiment, each of the first delay D1 and second delay D2 in the shift oscillation time controller 212 or shift oscillation time controller 312 is implemented with a first delay circuit DA and a second delay circuit DB.

Figure 9:
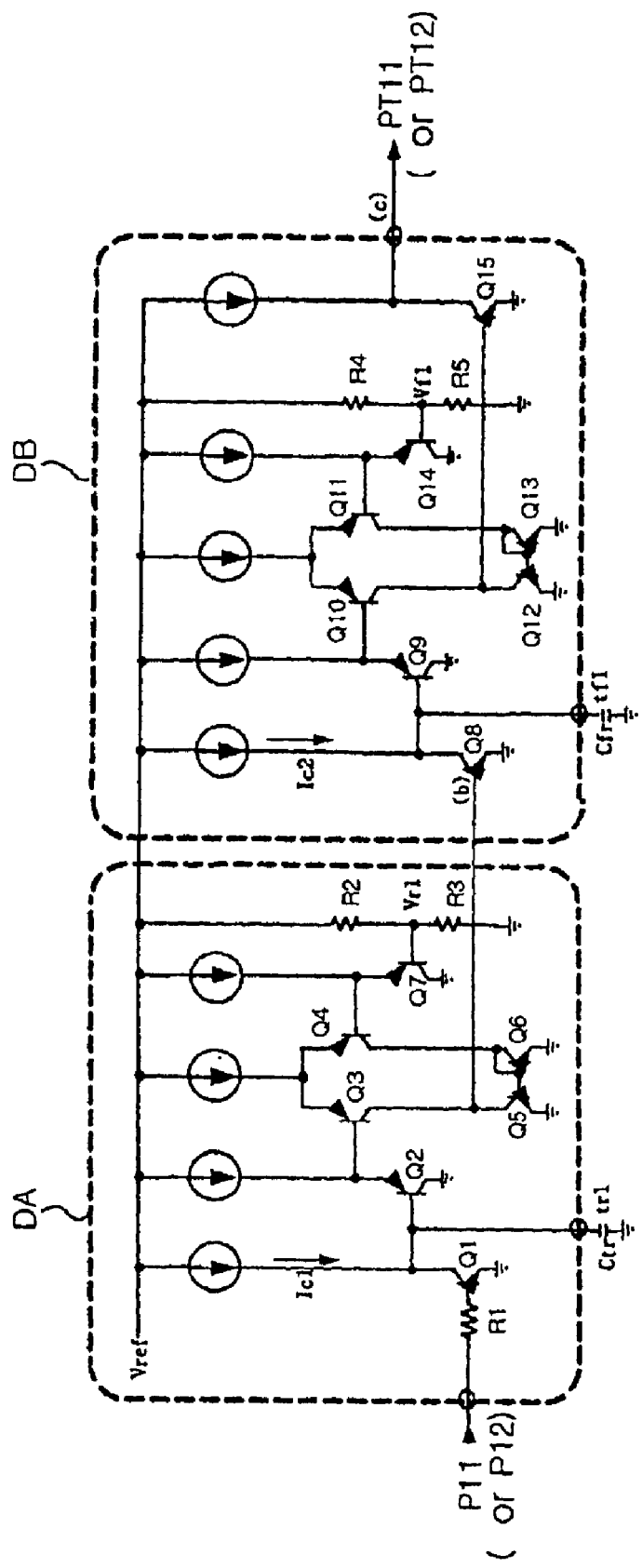
FIG. 9 is a circuit diagram of a delay in the shift oscillation time controller of FIG. 8.
Figure 10:
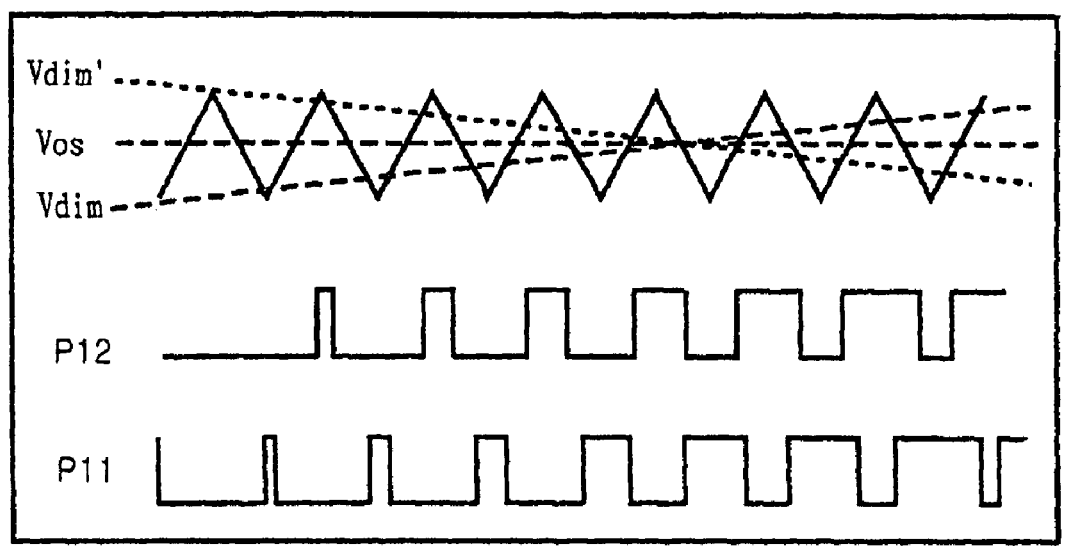
FIG. 10 is a timing diagram of output signals from the shift oscillation controller of FIG. 7.
Figure 11:
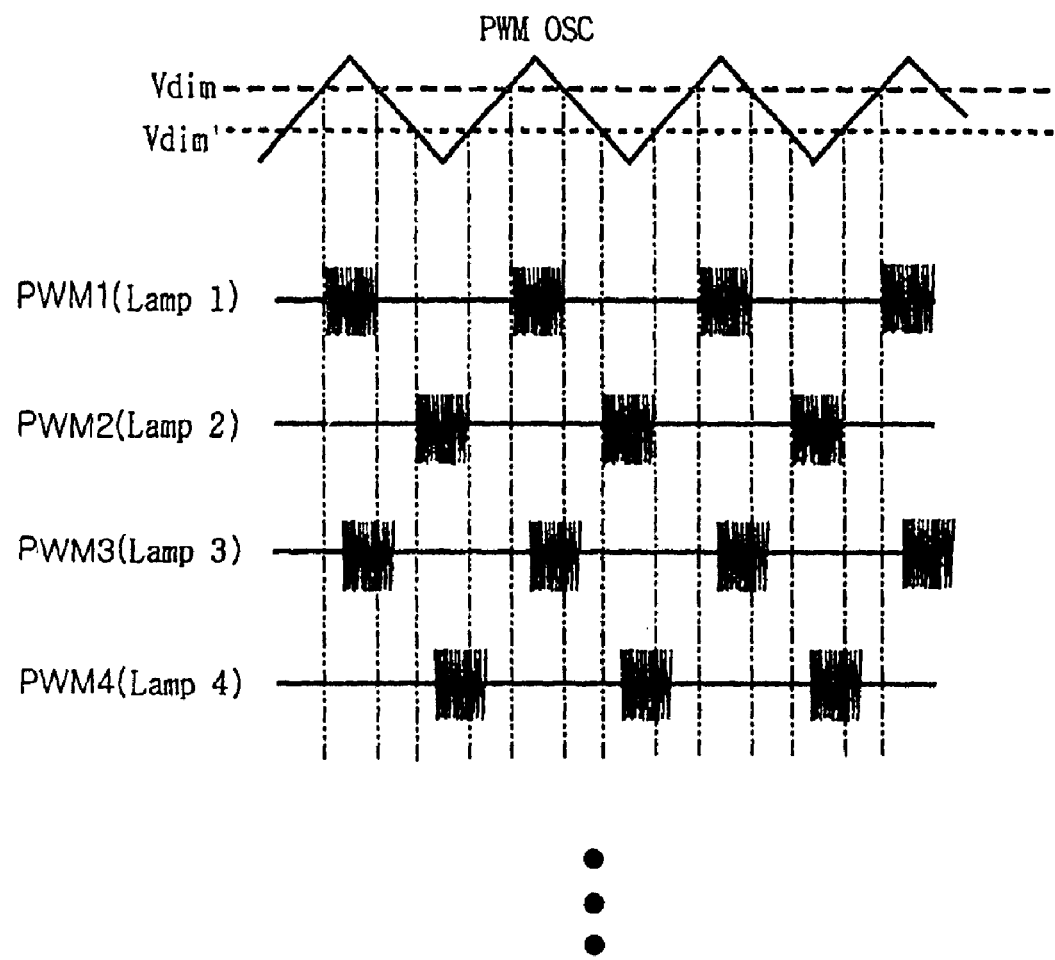
FIG. 11 is a timing diagram of PWM drive signals for driving four lamps in accordance with the present invention.

FIG. 9 is a circuit diagram of each delay in each shift oscillation time controller of FIG. 8, FIG. 10 is a timing diagram of output signals from the shift oscillation controller of FIG. 7, and FIG. 11 is a timing diagram of PWM drive signals for driving four lamps in accordance with the present invention.

A detailed description will hereinafter be given of the operation of the backlight inverter for the LCD panel with the above-stated construction in accordance with the present invention in conjunction with FIGS. 4 to 11.

With reference to FIG. 4, the backlight inverter for the LCD panel according to the present invention is adapted to drive a plurality of lamps Lamp1–Lamp4 in pairs. To this end, first, the main driving IC 210 generates the PWM pulses P11 and P12 in response to the dimming voltage Vdim based on the brightness control and the internally generated PWM oscillation signal PWM OSC, delays the generated PWM pulses P11 and P12 by the predetermined period of time and outputs the PWM drive signals PWM1 and PWM2 on the basis of the delayed PWM pulses PT11 and PT12, respectively. The sub-driving IC 310 delays the delayed PWM pulses PT11 and PT12 from the main driving IC 210 by the predetermined period of time and outputs the PWM drive signals PWM3 and PWM4 on the basis of the delayed PWM pulses PT21 and PT22, respectively.

The backlight inverter for the LCD panel according to the present invention can be applied to drive a plurality of lamps, for example, 4 lamps, 6 lamps, 8 lamps or etc. For example, in order to drive four lamps Lamp1–Lamp4, there are required a main driving IC corresponding to the lamps Lamp1 and Lamp2 and one sub-driving IC corresponding to the lamps Lamp3 and Lamp4. In order to drive six lamps Lamp1–Lamp6, there are required a main driving IC corresponding to the lamps Lamp1 and Lamp2 and two sub-driving ICs corresponding to the lamps Lamp3–Lamp6. In order to drive eight lamps Lamp1–Lamp8, there are required a main driving IC corresponding to the lamps Lamp1 and Lamp2 and three sub-driving ICs corresponding to the lamps Lamp3–Lamp8. For the convenience of description, the present invention will hereinafter be described with reference to a four-lamp configuration.

In this connection, the lamp operating circuits 220 and 320 each operate a corresponding one of the pairs of lamps Lamp1–Lamp4 in response to the PWM drive signals PWM1 and PWM2 from the main driving IC 210 or the PWM drive signals PWM3 and PWM4 from the sub-driving IC 310.

The operation of the main driving IC 210 will hereinafter be described with reference to FIGS. 4 and 5.

In the main driving IC 210 of FIG. 5, the shift oscillation controller 211 generates the PWM pulses P11 and P12 in response to the dimming voltage Vdim and PWM oscillation signal PWM OSC. The shift oscillation time controller 212 delays the PWM pulses P11 and P12 from the shift oscillation controller 211 by the predetermined period of time and outputs the delayed PWM pulses PT11 and PT12 internally, and externally to the sub-driving IC 310. The comparison circuit 213 compares the PWM pulses PT11 and PT12 from the shift oscillation time controller 212 with the predetermined reference signals to adjust duty ratios of the reference signals according to the PWM pulses PT11 and PT12, respectively. The output drivers 214A and 214B generate the PWM drive signals PWM1 and PWM2 in response to the output PWM pulses from the comparison circuit 213, respectively, and output the generated PWM drive signals PWM1 and PWM2 to the power switches SWA and SWB in the lamp operating circuit 220, respectively.

In the lamp operating circuit 220, the power switches SWA and SWB convert the DC voltage Vcc into squarewave, voltages in response to the PWM drive signals EWM1 and PWM2 from the main driving IC 210, respectively. The converters 221A and 221B rectify the square-wave voltages from the power switches SWA and SWB, respectively. The transformer oscillators 222A and 222B receive the output voltages from the converters 221A and 221B, induce AC voltages in their secondary sides through their selfoscillation circuits and output the induced AC voltages to the corresponding pair of lamps Lamp1 and Lamp2, respectively. The lamp voltage detectors 223A and 223B detect voltages resulting from currents flowing through the corresponding pair of lamps Lamp1 and Lamp2, respectively.

The operation of the sub-driving IC 310 will hereinafter be described with reference to FIGS. 4 and 6.

In the sub-driving IC 310 of FIG. 6, the shift oscillation time controller 312 delays the PWM pulses PT11 and PT12 from the main driving IC 210 by the predetermined period of time and outputs the delayed PWM pulses PT21 and PT22 internally, and externally to the subsequent sub-driving IC. The comparison circuit 313 compares the PWM pulses PT21 and PT22 from the shift oscillation time controller 312 with the predetermined reference signals to adjust duty ratios of the reference signals according to the PWM pulses PT21 and PT22, respectively. The output drivers 314A and 314B generate the PWM drive signals PWM3 and PWM4 in response to the output PWM pulses from the comparison circuit 313, respectively, and output the generated PWM drive signals PWM3 and PWM4 to the power switches SWC and SWD in the lamp operating circuit 320, respectively.

In the lamp operating circuit 320, the power switches SWC and SWD convert the DC voltage Vcc into squarewave voltages in response to the PWM drive signals PWM3 and PWM4 from the sub-driving IC 310, respectively. The converters 321A and 321B rectify the square-wave voltages from the power switches SWC and SWD, respectively. The transformer oscillators 322A and 322B receive the output voltages from the converters 321A and 321B, induce AC voltages in their secondary sides through their selfoscillation circuits and output the induced AC voltages to the corresponding pair of lamps Lamp3 and Lamp4, respectively. The lamp voltage detectors 323A and 323B detect voltages resulting from currents flowing through the corresponding pair of lamps Lamp3 and Lamp4, respectively.

As described above, using the shift oscillation time controller in each driving IC, the PWM signals P11 and P12 from the shift oscillation controller 211 in the main driving IC or the PWM signals PT11 and PT12 from the shift oscillation time controller in the main driving IC are inputted respectively to the corresponding output drivers to operate the corresponding power switches in different PWM on/off periods. In other words, the shift oscillation time controller shifts and outputs the PWM signals to the corresponding output drivers, respectively, by a predetermined period of time based on charging times of external capacitors.

The operation of the shift oscillation controller 211 in the main driving IC 210 will hereinafter be described with reference to FIG. 7.

In the shift oscillation controller 211 of FIG. 7, the PWM oscillator 211A generates the sawtooth-wave pulse of the predetermined frequency as the PWM oscillation signal PWM OSC. The first comparator 211B compares the sawtooth-wave pulse from the PWM oscillator 211A with the dimming voltage Vdim and outputs the first PWM pulse P11 as shown in FIG. 10 as a result of the comparison. The inverter 211C inverts the dimming voltage Vdim about the predetermined reference voltage Vos. The second comparator 211D compares the sawtooth-wave pulse from the PWM oscillator 211A with the inverted dimming voltage Vdim' from the inverter 211C and outputs the second PWM pulse P12 as shown in FIG. 10 as a result of the comparison. In this process, a determination is made as to duty ratios of the first PWM pulse P11 and second PWM pulse P12.

The operation of the shift oscillation time controller 212 in the main driving IC 210 will hereinafter be described with reference to FIG. 8.

In the shift oscillation time controller 212 of FIG. 8, the first delay D1 delays the first PWM pulse P11 from the shift oscillation controller 211 by the predetermined time period, and the second delay D2 delays the second PWM pulse P12 from the shift oscillation controller 211 by the predetermined time period. The first output comparator COMP1 compares the output signal from the first delay D1 with the reference voltage Vr and outputs the delayed PWM pulse PT11 as a result of the comparison. The second output comparator COMP2 compares the output signal from the second delay D2 with the reference voltage Vr and outputs the delayed PWM pulse PT12 as a result of the comparison.

On the other hand, in the shift oscillation time controller 312 of the sub-driving IC 310, the first delay D1 delays the PWM pulse PT11 from the shift oscillation time controller 212 in the main driving IC 210 by the predetermined time period, and the second delay D2 delays the PWM pulse PT12 from the shift oscillation time controller 212 in the main driving IC 210 by the predetermined time period. The first output comparator COMP1 compares the output signal from the first delay D1 with the reference voltage Vr and outputs the delayed PWM pulse PT21 as a result of the comparison. The second output comparator COMP2 compares the output signal from the second delay D2 with the reference voltage Vr and outputs the delayed PWM pulse PT22 as a result of the comparison.

FIG. 9 shows a circuit configuration of each delay in each shift oscillation time controller of FIG. 8. The first delay D1 and the second delay D2 preferably have the same circuit configuration as shown in FIG. 9.

With reference to FIGS. 8 and 9, two external capacitors are connected to each of the first delay D1 and second delay D2 to set a delay time to delay an input PWM signal at rising and falling edges thereof. One external capacitor is connected to a transistor Q1 of the first delay D1 or second delay D2 and begins to charge at the moment that the PWM signal P11 or P12 makes a high to low transition. At this time, the capacitor connected to the transistor Q1 charges up to a voltage level Vr1 by a current source Ic1. At the time that the voltage level of the capacitor reaches Vr1, the voltage level at a node b goes high and the voltage level at a node c goes low. When the PWM signal P11 or P12 makes a low to high transition, the voltage level at the node b goes low and the other external capacitor connected to the external terminal Tf1 charges by a current source Ic2. At the moment that the voltage level at the external terminal Tf1 reaches Vf1, the voltage level at the node c goes low. Assuming that the capacitors connected respectively to the transistor Q1 and external terminal Tf1 have the same capacitances and the current sources have the same current levels, it is possible to shift the PWM signal P11 or P12 at the node c by a certain time interval while maintaining its duty ratio. In this case, the delay time can be expressed as in the below equation 1:

$$T = \frac{Ctr1 \times Vtr}{Ic1}(Ctr = Cfr, Vtr = Vtf, Ic1 = Ic2)$$

FIG. 11 shows waveforms of PWM drive signals for driving four lamps in accordance with the present invention.

With reference to FIG. 11, in the case where the backlight inverter for the LCD panel according to the present invention is applied to a plurality of lamps, for example, four lamps, the lamps Lamp1 and Lamp2 are operated with the PWM drive signals PWM1 and PWM2 based on the delayed PWM signals PT11 and PT12 from the main driving IC 210 of FIG. 5, and the lamps Lamp3 and Lamp4 are operated with the PWM drive signals PWM3 and PWM4 based on the delayed PWM signals PT21 and PT22 from the sub-driving IC 310 of FIG. 6.

Here, the PWM signals PT11 and PT12 are in inverted relation to each other and the PWM signals PT21 and PT22 are in inverted relation to each other. Also, the PWM signal PT21 is a shifted version of the PWM signal PT11 and the PWM signal PT22 is a shifted version of the PWM signal PT12.

As described above, in the case where the backlight inverter for the LCD panel according to the present invention is applied to a plurality of CCFLs, the amount of current flowing in a power supply circuit is in proportion to the number of the CCFLs, and a PWM signal-based dimming system is employed to adjust the brightness of the lamps. When power switches are simultaneously turned on/off in response to PWM drive signals to regulate the supply of power to the lamps, overshoot in the power supply circuit increases in proportion to the number of the lamps. In consideration of this fact, according to the present invention, the PWM drive signals corresponding respectively to the CCFLs are sequentially delayed by a predetermined time interval to reduce the overshoot and switching noise so as to stabilize the system.

As apparent from the above description, the present invention provides a backlight inverter for a thin film transistor-liquid crystal display (TFT-LCD) panel, which is capable of delaying a plurality of pairs of PWM drive signals, which are inputted respectively to power switches to drive a plurality of cold cathode fluorescent lamps (CCFLs) in pairs, sequentially by a predetermined time interval in such a manner that the PWM drive signal pairs corresponding respectively to the lamp pairs have different phases and the lamps thus have different PWM on/off periods, so that overshoot of a power supply circuit can be reduced so as to keep the entire system power stable and so that switching noise based on PWM dimming can be reduced so as to reduce screen noise and increase system reliability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A backlight inverter for a liquid crystal display (LCD) panel for driving a plurality of lamps in pairs, comprising:
 a main driving integrated circuit (IC) for generating first and second pulse width modulation (PWM) pulses in response to a dimming voltage based on a brightness control and an internally generated PWM oscillation signal, delaying the generated first and second PWM pulses by a predetermined period of time and outputting first and second PWM drive signals on a basis of the delayed first and second PWM pulses, respectively;
 at least one sub-driving IC for secondarily delaying said delayed first and second PWM pulses from said main driving IC by said predetermined period of time and outputting third and fourth PWM drive signals on a basis of the secondarily delayed first and second PWM pulses, respectively; and
 a plurality of lamp operating circuits for operating said pairs of lamps in response to said first and second PWM drive signals from said main driving IC and said third and fourth PWM drive signals from said sub-driving IC, respectively.

2. The backlight inverter as set forth in claim 1, wherein said lamp operating circuits each include:
 a pair of power switches for converting a direct current (DC) voltage into square-wave voltages in response to said first and second PWM drive signals from said main driving IC or said third and fourth PWM drive signals from said sub-driving IC, respectively;
 a pair of converters for rectifying the square-wave voltages from said power switches, respectively;
 a pair of transformer oscillators for converting output voltages from said converters into alternating current (AC) voltages and outputting the converted AC voltages to a corresponding one of said pairs of lamps, respectively; and
 a pair of lamp voltage detectors for detecting voltages resulting from currents flowing through the corresponding pair of lamps, respectively.

3. The backlight inverter as set forth in claim 1, wherein said main driving IC includes:
 a shift oscillation controller for generating said first and second PWM pulses in response to said dimming voltage and PWM oscillation signal;
 a shift oscillation time controller for delaying said first and second PWM pulses from said shift oscillation controller by said predetermined period of time and outputting the delayed first and second PWM pulses internally, and externally to said sub-driving IC;
 a comparison circuit for comparing said delayed first and second PWM pulses from said shift oscillation time controller with predetermined reference signals to adjust duty ratios of the reference signals according to said delayed first and second PWM pulses, respectively; and
 first and second output drivers for generating said first and second PWM drive signals in response to output PWM pulses from said comparison circuit, respectively, and outputting the generated first and second PWM drive signals to a corresponding one of said lamp operating circuits.

4. The backlight inverter as set forth in claim 3, wherein said shift oscillation controller includes:
 a PWM oscillator for generating a sawtooth-wave pulse of a predetermined frequency as said PWM oscillation signal;
 a first comparator for comparing said sawtooth-wave pulse from said PWM oscillator with said dimming voltage and outputting said first PWM pulse as a result of the comparison;

an inverter circuit for inverting said dimming voltage about a predetermined reference voltage; and a second comparator for comparing said sawtooth-wave pulse from said PWM oscillator with the inverted dimming voltage from said inverter circuit and outputting said second PWM pulse as a result of the comparison.

5. The backlight inverter as set forth in claim 3, wherein said shift oscillation time controller in said main driving IC includes:

a first delay for delaying said first PWM pulse from said shift oscillation controller by said predetermined time period; and a second delay for delaying said second PWM pulse from said shift oscillation controller by said predetermined time period.

6. The backlight inverter as set forth in claim 5, wherein said shift oscillation time controller in said main driving IC further includes:

a first output comparator for comparing an output signal from said first delay with a reference voltage and outputting said delayed first PWM pulse as a result of the comparison; and a second output comparator for comparing an output signal from said second delay with said reference voltage and outputting said delayed second PWM pulse as a result of the comparison.

7. The backlight inverter as set forth in claim 3, wherein said shift oscillation time controller includes a plurality of delay time setting capacitors connected respectively to external terminals thereof.

8. The backlight inverter as set forth in claim 1, wherein said sub-driving IC includes:

a shift oscillation time controller for secondarily delaying said delayed first and second PWM pulses from said main driving IC by said predetermined period of time and outputting the secondarily delayed first and second PWM pulses internally, and externally to a subsequent sub-driving IC;

a comparison circuit for comparing said secondarily delayed first and second PWM pulses from said shift oscillation time controller with predetermined reference signals to adjust duty ratios of the reference signal's according to said secondarily delayed first and second PWM pulses, respectively; and first and second output drivers for generating said third and fourth PWM drive signals in response to output PWM pulses from said comparison circuit, respectively, and outputting the generated third and fourth PWM drive signals to a corresponding one of said lamp operating circuits.

9. The backlight inverter as set forth in claim 8, wherein said shift oscillation time controller in said sub-driving IC includes:

a first delay for secondarily delaying said delayed first PWM pulse from said main driving IC by said predetermined time period; and a second delay for secondarily delaying said delayed second PWM pulse from said main driving IC by said predetermined time period.

10. The backlight inverter as set forth in claim 9, wherein said shift oscillation time controller in said sub-driving IC further includes:

a first output comparator for comparing an output signal from said first delay with a reference voltage and outputting said secondarily delayed first PWM pulse as a result of the comparison; and a second output comparator for comparing an output signal from said second delay with said reference voltage and outputting said secondarily delayed second PWM pulse as a result of the comparison.

11. The backlight inverter as set forth in claim 8, wherein said shift oscillation time controller includes a plurality of delay time setting capacitors connected respectively to external terminals thereof.

* * * * *